United States Patent [19]
Silverstein et al.

[11] Patent Number: 5,229,799
[45] Date of Patent: Jul. 20, 1993

[54] COLLAPSIBLE SLIDE CAROUSEL

[75] Inventors: Fred E. Silverstein, Seattle; Andrew H. Proctor, Duvall, both of Wash.

[73] Assignee: Silversquare, Seattle, Wash.

[21] Appl. No.: 857,083

[22] Filed: Mar. 19, 1992

Related U.S. Application Data

[63] Continuation of Ser. No. 806,836, Dec. 9, 1991, abandoned, which is a continuation of Ser. No. 686,587, Apr. 17, 1991, abandoned.

[51] Int. Cl.⁵ .................................................. G03B 23/00
[52] U.S. Cl. ....................................... 353/120; 206/456; 353/117
[58] Field of Search ................ 353/103, 107, 113, 114, 353/116, 117, 119, 122, 120, DIG. 1, DIG. 3, DIG. 5; 40/513, 155; 206/455, 456

[56] References Cited

U.S. PATENT DOCUMENTS

| | | |
|---|---|---|
| 2,805,502 | 9/1957 | Smith et al. |
| 3,322,027 | 5/1967 | Forbes et al. |
| 3,382,019 | 5/1968 | Maule |
| 3,413,062 | 11/1968 | Zillmer |
| 3,704,943 | 12/1972 | Rube .................... 353/117 |
| 3,718,392 | 2/1973 | Harvey .................. 353/111 |
| 3,820,886 | 6/1974 | Frey et al. |
| 3,843,246 | 10/1974 | Johannsen |
| 3,870,408 | 3/1975 | Kirr |
| 3,920,324 | 11/1975 | Oho ..................... 353/117 |
| 3,968,878 | 7/1976 | Winkler ................. 353/117 |
| 3,994,578 | 11/1976 | Barowski et al. ........ 353/117 |
| 4,245,899 | 1/1981 | Lundberg ............... 353/117 |
| 4,402,584 | 9/1983 | Palmer |
| 4,765,469 | 8/1988 | Seifert |
| 4,865,442 | 9/1989 | Steiner |

FOREIGN PATENT DOCUMENTS

0045666A1 8/1981 European Pat. Off.
3718837A1 6/1987 Fed. Rep. of Germany.

Primary Examiner—William A. Cuchlinski, Jr.
Assistant Examiner—William C. Dowling
Attorney, Agent, or Firm—Seed and Berry

[57] ABSTRACT

A collapsible slide carousel which allows for more efficient storage and transport thereof. The collapsible slide carousel includes an upper portion, a lower portion and a plurality of slide dividers pivotally secured to the upper and lower portions such that the slides can be positioned in an erect position or a collapsed position. In the erect position the slides are disposed substantially vertically as in a conventional carousel such that the slides can be viewed utilizing a conventional carousel projector. Alternatively, in the collapsed position the slides are disposed in an angular position overlapping one another in a domino-like manner allowing for more efficient storage and transportation of the carousel. The upper portion of the carousel is rotatably disposed with respect to the lower portion such that the carousel can be adjusted from the erect position to the collapsed position, and vice versa, by rotating the upper portion with respect to the lower portion. In the erect position the upper portion is displaced from the lower portion and in the collapsed position the upper portion is disposed adjacent the lower portion. The carousel further include a spring for urging the upper portion away from the lower portion such that the slides are urged toward the erect position.

27 Claims, 4 Drawing Sheets

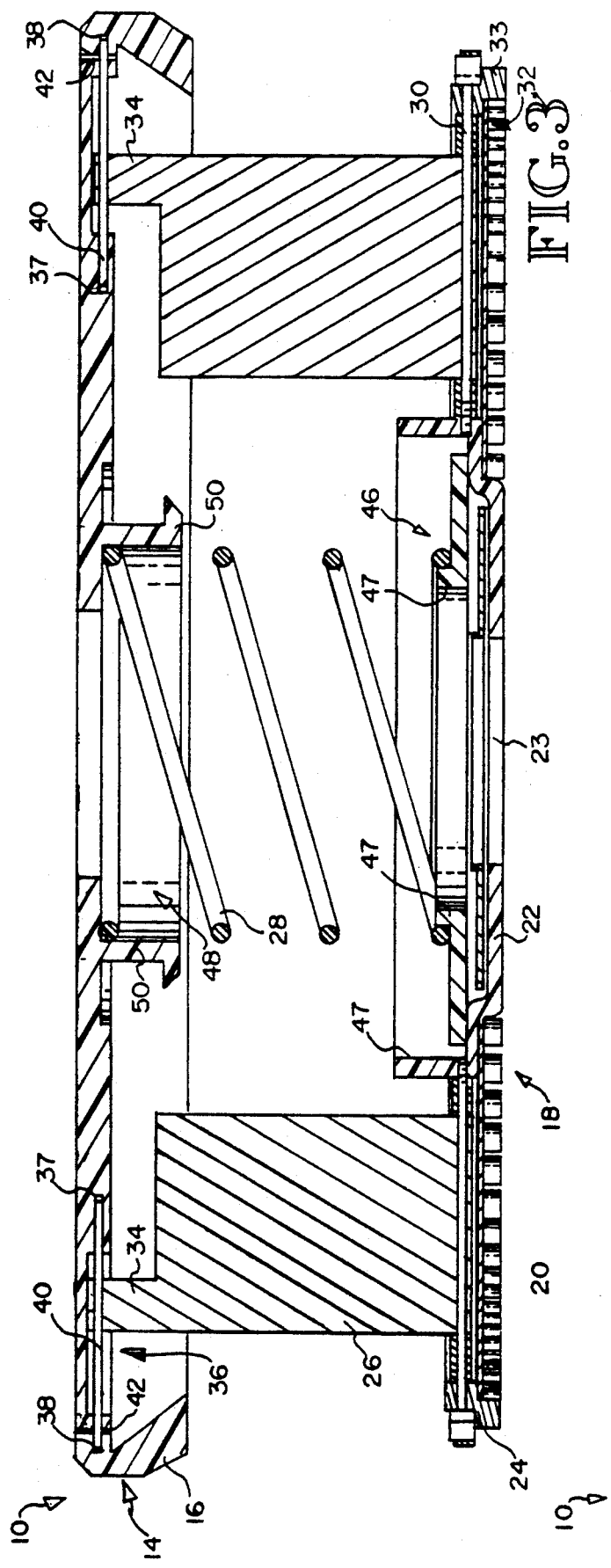
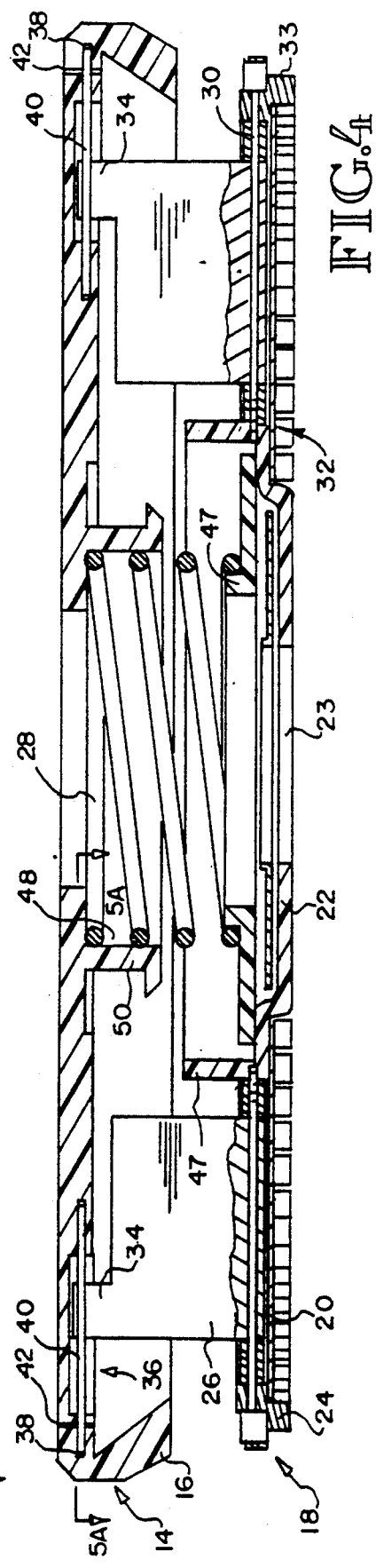

COLLAPSIBLE SLIDE CAROUSEL

CROSS-REFERENCE TO RELATED APPLICATION

This application is a file wrapper continuation of U.S. application Ser. No. 07/806,836, filed Dec. 9, 1991, now abandoned, which was a file wrapper continuation of U.S. application Ser. No. 07/686,587, filed Apr. 17, 1991, now abandoned.

TECHNICAL FIELD

The present inventions relates slide projectors and more particularly to a collapsible slide carousel.

BACKGROUND OF THE INVENTION 35 millimeter slides are a major method of communication in our society at the present time. The current state of the art is to load the slides into a round "carousel" which fits onto a carousel slide projector. There are several million carousel projector systems currently in use. Literally every school, college, company and many individuals have these carousel projectors. One of the primary uses of a carousel projector system is for giving lectures. Typically, twenty to fifty slides are used per lecture. Rarely are fewer than ten slides used for a lecture nor are more than seventy commonly used for a lecture. There are two common carousel designs, one which holds eighty slides and one which holds one hundred and sixty slides.

The primary problem associated with the current carousel design is that its relatively large size prevents the lecturer from easily transporting the carousel. For example, the standard carousel is 2.38 inches tall and cannot fit into the average size briefcase. Nor can the standard carousel be efficiently stored on bookshelves. The result of the storage problem is that the slides are stored either in boxes where the slides are positioned adjacent one another, or in individual plastic sheets designed to hold twenty slides.

Accordingly, most lecturers transport the slides in the slide boxes or sheets. When a lecturer arrives at the site of the lecture, he or she must first find a functional carousel and then load each of the slides in the carousel. Each slide must be removed from the box or from the pockets in the plastic sheet and placed into the carousel. In doing so, it critical that the slides be placed in the carousel in the proper orientation and order. Therefore, the lecturer must spend the extra time necessary to insure that the orientation and the order of the slides are correct. Subsequent to the lecture, the lecturer must then remove the slides from the carousel and replace the slides in the storage boxes or the plastic sheets. Again, this provides another opportunity for the slides to be stored in the incorrect order. Furthermore, due to the handling of the slides, the slides often become damaged.

As can be seen from the foregoing, the present slide carousel system is not ideal. It is inefficient in terms of its relatively large size and its ability to be transported. The amount of time spent removing slides from the plastic sheets or from the storage boxes, loading the slides into a carousel, checking the orientation and re-loading the slides subsequent to the lecture is in excess of ten minutes. This whole process makes inexperienced lecturers nervous and generates a large amount of unnecessary anxiety. In fact, it has been said that the major current limitation to the use of slides for communication is difficulty with storage of the slides and for transportation thereof.

SUMMARY OF THE INVENTION

The present invention resides in a collapsible slide carousel which allows for more efficient storage and transport thereof. The collapsible slide carousel comprises an upper portion, a lower portion and means for positioning a plurality of slides substantially between the upper portion and the lower portion in such a manner that the slides can be positioned in an erect position or a collapsed position. In the erect position, the slides are disposed substantially vertically as in a conventional carousel so that the slides can be viewed utilizing a conventional carousel projector. Alternatively, in the collapsed position the slides are disposed in an angular position overlapping one another in a domino-like manner allowing for more efficient storage and transportation of the carousel.

The upper portion of the carousel is rotatably disposed with respect to the lower portion such that the carousel can be adjusted between the erect position and the collapsed position by rotating the upper portion with respect to the lower portion. In the erect position the upper portion is displaced from the lower portion and in the collapsed position the upper portion is disposed adjacent the lower portion. The carousel further includes a spring for urging the upper portion away from the lower portion such that the slides are urged toward the erect position.

In a preferred embodiment of the invention, the upper portion includes a disc-like plate while the lower portion includes an annular bottom plate, a central hub and an outer ring circumscribing and interconnected to the hub. The positioning means, discussed above, includes a plurality of separators for separating the slides within the carousel, a plurality of slide rods for pivotally connecting a top end of each of the separators to the upper portion, or plate, and a plurality of pivot rods for pivotally connecting a bottom end of each of the separators to the lower portion. The separators are slidably attached to the pivot rods, each of the pivot rods is respectively connected at opposite ends to the hub and the outer ring of the bottom portion and each separator is pivotally secured thereto.

Although the invention is described as being applicable to a circular slide projector carousel, it will be understood that the invention may also be applied to a linear slide tray.

BRIEF DESCRIPTION OF THE DRAWINGS

FIG. 3 is a cross-sectional view of the carousel taken along line 3—3 of FIG. 1;

FIG. 4 is a cross-sectional view of the carousel taken along line 4—4 of FIG. 2;

DETAILED DESCRIPTION OF THE INVENTION

Figure 1:
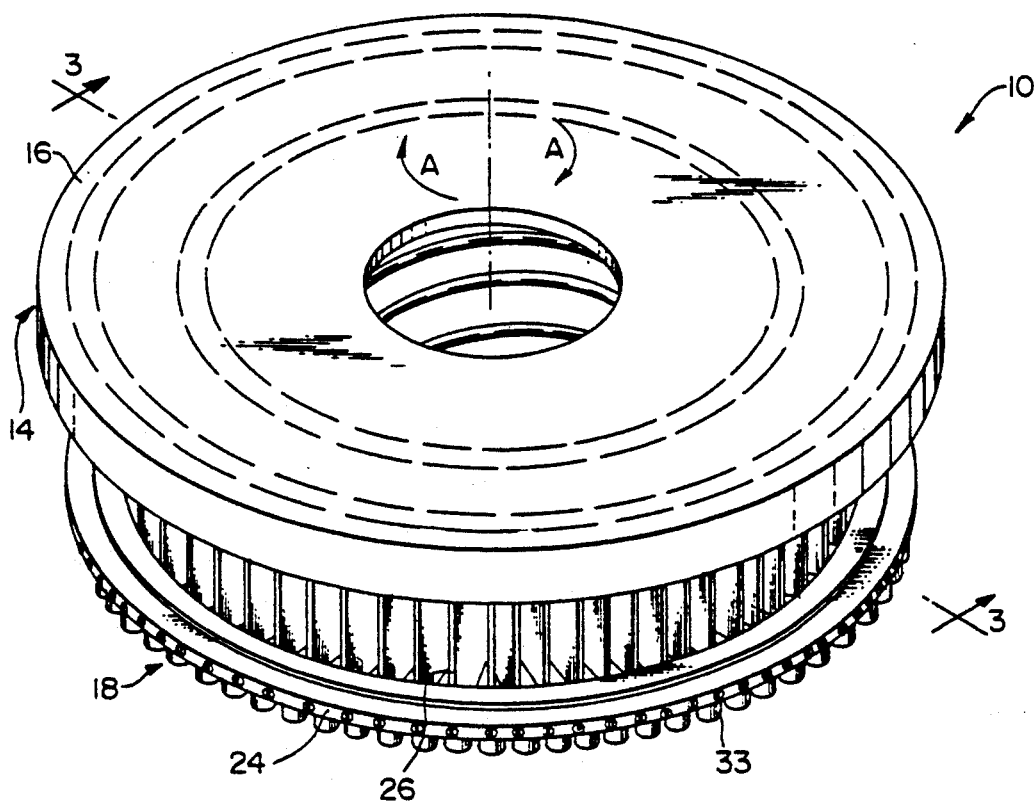
FIG. 1 is an isometric view illustrating the collapsible slide carousel of the present invention in the erect position.
Figure 2:
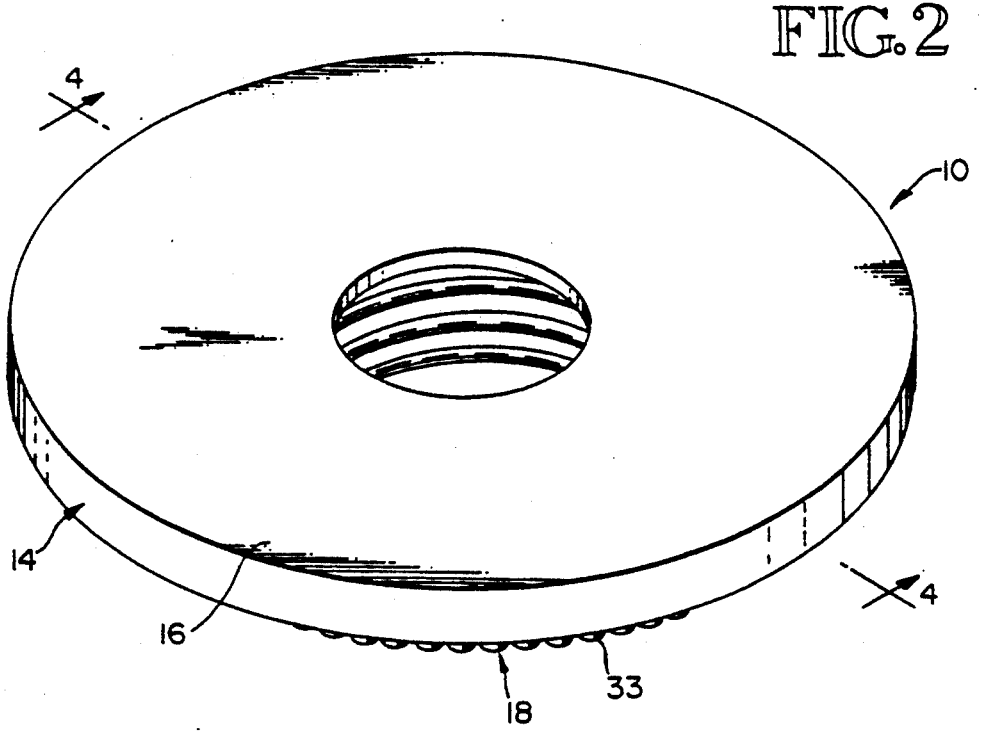
FIG. 2 is an isometric view illustrating the carousel in the collapsed position.

Referring to FIGS. 1 and 2, the present invention resides in a collapsible slide carousel 10 designed such that the slides (not shown) can be positioned in an erect vertical position (FIG. 1) or in a collapsed position (FIG. 2) so that the overall size of the carousel can be reduced. Specifically, in the erect position the slides are disposed vertically in the carousel as in a conventional slide carousel so that the slides can be viewed using a conventional carousel projector. However, for efficient storage and transport of the carousel, the slides can be repositioned in a collapsed position where the slides overlap one another in a domino-like manner such that the height of the carousel is reduced, as illustrated in FIG. 2.

In more detail, as best illustrated in FIGS. 1 through 3, the slide carousel 10 generally includes an upper portion 14 including a top plate 16; a lower portion 18 including a bottom plate 20 and a central hub 22 interconnected to an outer rim 24; a plurality of slide dividers 26 interconnecting the upper portion 14 to the lower portion 18; and a spring 28 for urging the upper portion 14 away from the lower portion 18 such that the carousel is disposed in the erect position.

The central hub 22 is disposed in the center of the carousel and is circumscribed by the outer rim 24. A plurality of pivot rods 30 are radially provided in the carousel for interconnecting the outer rim 24 to the central hub 22 and for pivotally supporting each of the slide dividers 26 at the bottom portion thereof.

The bottom plate 20 is similar to the bottom plate of a conventional carousel. Specifically, referring to FIG. 3, the bottom plate 20 is annular in shape and has a central opening 23. The bottom plate 20 is positioned in an annular recess 32 defined by the central hub 22 and outer rim 24, as illustrated, for retaining the slides in the carousel. The outer rim 24 also contains locating pins 33 for aligning each of the slides in the slide carousel 10 with the slide handling mechanism in the projector (not shown). The bottom plate is designed to be fixedly secured in the slide projector during operation. A single opening (not shown) is provided in the bottom plate 20 for allowing the slides to be individually introduced into the projector as the slide carousel 10 rotates therearound, similar to the conventional manner. Therefore, the collapsible carousel of the present invention is operable on a conventional carousel projector without requiring any modifications to the projector.

Referring to FIGS. 3 through 5, the top of each of the slide dividers 26 is supported by the top plate 16 as follows. Each of the slide dividers 26 is L-shaped including a leg 34 extending upwardly therefrom. The top plate includes an annular recess 36 for receiving the leg 34 of each of the dividers. Further, an inner slot 37 and outer slot 38 are respectively provided on opposite sides of the recess 36 and extend circumferentially around the top plate 16. The legs 34 are slidably secured to respective slide rods 40 which extend between inner and outer slots 37, 38, respectively, as illustrated. The outer end of each slide rod 40 is pivotally secured to the top plate 16 within the slot 38 by respective vertically disposed pins 42.

Figure 5A:
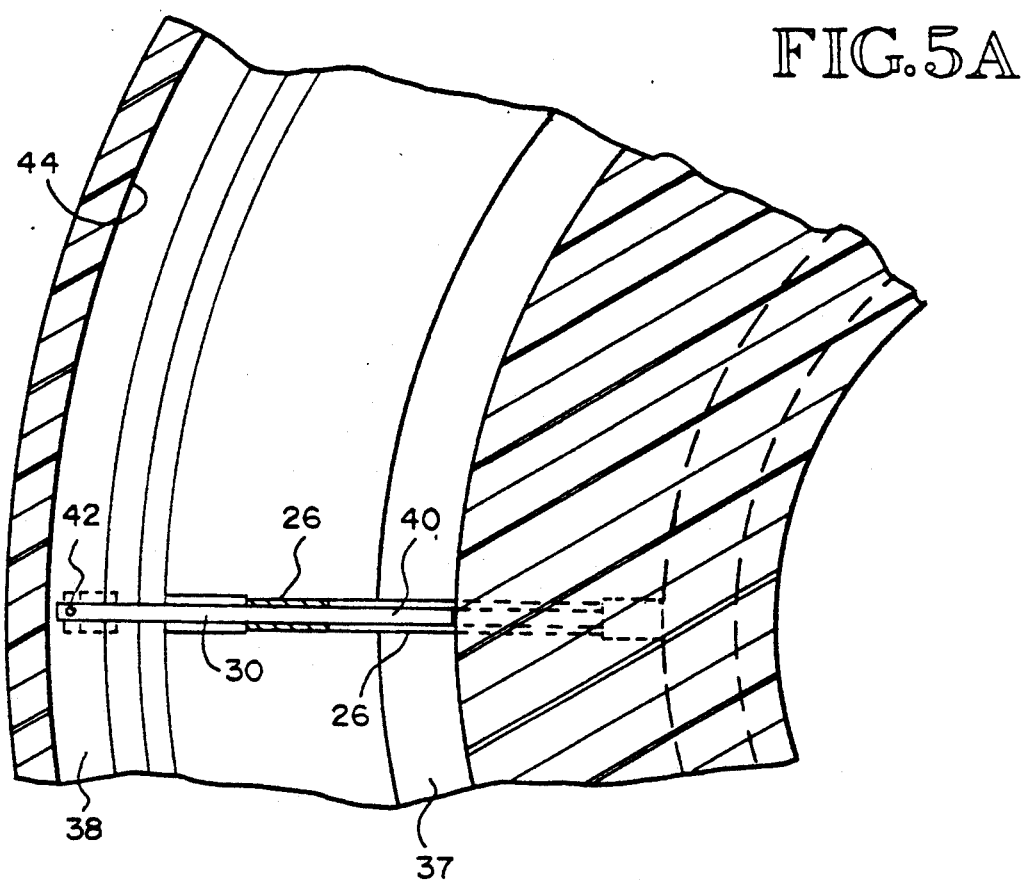
FIGS. 5A and 5B are partial cross-sectional views of the carousel taken along line 5—5 of FIG. 4 showing the carousel in the erect and collapsed positions, respectively.
Figure 5B:
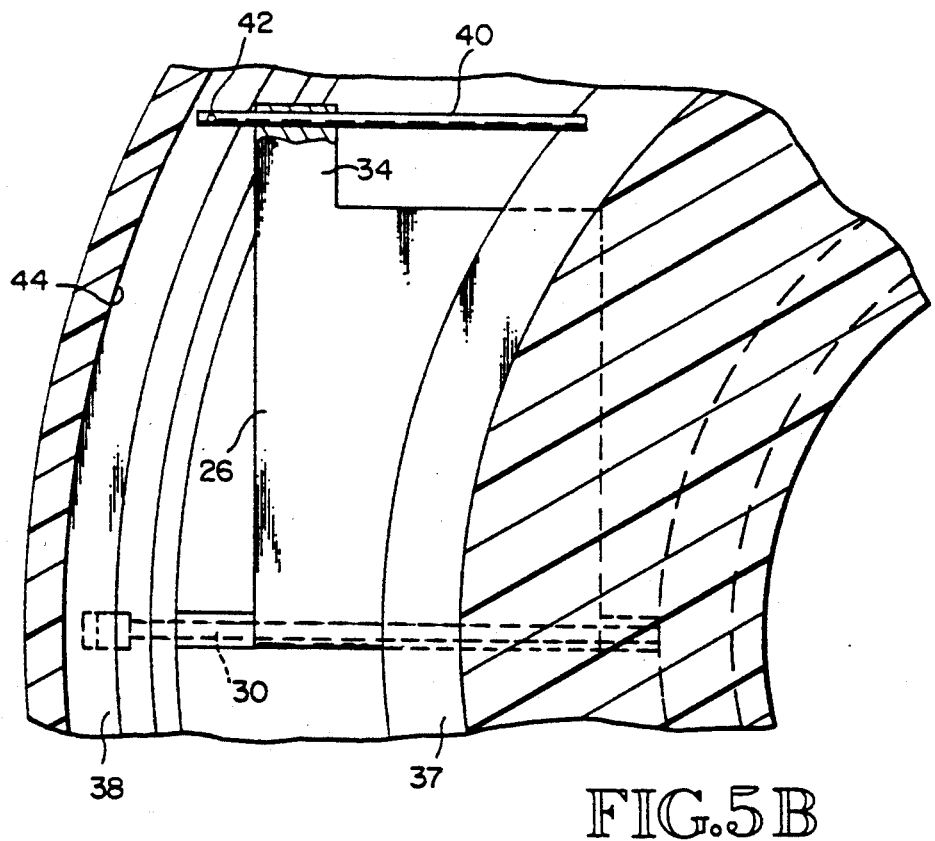

The dividers 26 pivot from the erect position to the collapsed position by rotating the upper portion 14 with respect to the lower portion 18 in the direction of arrow A (FIG. 1) thereby causing each of the dividers 26 to pivot about each of the pivot rods 30. The reason for slidably connecting the legs 34 to the slide rods 40 and for pivotally mounting the slide rods 40 in the slot 38 is best illustrated in FIGS. 5A and 5B. With reference to FIG. 5A, when the slide carousel 10 is in its erect configuration, the dividers 26 are disposed vertically, and the dividers 26 and slide rod 40 extend along a radial of carousel 10. In this position, the leg 34 is positioned at the approximate midpoint of the rod 40.

When the carousel 10 is collapsed, as illustrated in FIG. 5B, the divider rotates about pivot rod 30. In this position, the portion of the leg 34 surrounding the rod 40 no longer extends along a radial of the carousel 10. It is, therefore, necessary to allow the rod 40 to pivot about pin 42 while allowing the inner end of the rod 40 to slide in the slot 37 with the slots 37, 38 fixing the axial position of the rod 40. Also, as the divider 26 rotates about rod 30, the upper end of the leg 34 moves outwardly in a radial direction. It is for this reason that the leg 34 must be slidably disposed on the rod 40.

Although the preferred embodiment uses dividers 26 that are formed by a sheet of planar material, other configurations may be used. For example, dividers may be formed by a web or one or more strands of flexible line. In fact, if the slides are properly supported between the upper and lower portions 14, 16, respectively, no divider at all may be necessary.

As noted above, the spring 28 urges the upper portion 14 of the carousel 10 away from the lower portion 18. Referring to FIGS. 3 and 4, the latch plate 69 includes a recessed area 46 defined by a lower circumferential projection 47 in which the lower end of the spring is retained. Correspondingly, the upper plate 16 includes a recessed area 48 defined by an upper circumferential projection 50 for retaining the upper end of the spring 28. Since the spring 28 urges the upper portion 14 away from the lower portion 18, the spring 28 biases the carousel 10 in the erect position, as discussed above.

Figure 6:
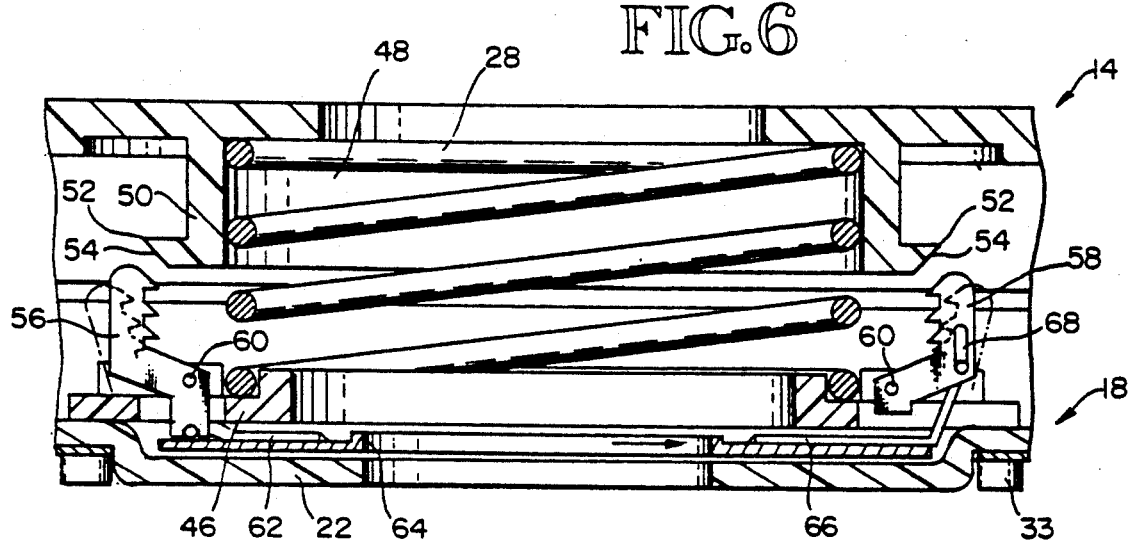
FIG. 6 is an exploded view of the locking mechanism of the carousel illustrated in FIG. 4.

Referring also to FIG. 6, the upper portion 14 and hub 22 include a means for locking the carousel 10 in the collapsed position. Specifically, the circumferential projection 50 terminates in an outwardly projecting latch member 52 having a tapered edge 54. A pair of multi-toothed pawls 56, 58 are pivotally mounted on the latch plate 69 at 60. An actuating rod 62 extending from a ring 64 is pivotally secured to the lower end of the pawl 56. Another actuating rod 66 extends from the opposite side of the ring 64 to a slot 68 formed in the pawl 58. The ring 64 is resiliently biased to the left by a suitable spring, as illustrated in FIG. 6.

When the slide carousel is collapsed, the tapered surface 54 contacts the upper ends of the pawls 56, 58 and displaces them outwardly until the latch member 52 is captured by one of the teeth on each of the pawls 56, 58. The carousel 10 is then locked in its collapsed condition. The carousel 10 is transformed into its erect configuration by displacing the ring 64 to the right (as illustrated in FIG. 6) thereby displacing the pawls 56, 58 outwardly away from the latch member 52. The spring 28 then displaces the top plate 14 upwardly away from the bottom plate 18 until the carousel is in its erect configuration.

Although the preferred embodiment of the carousel uses a spring 28 to bias the carousel in the erect configuration and a latch mechanism to secure it in the collapsed configuration, it will be apparent that other mechanisms may be used. For example, a screw type mechanism could be used to displace the upper and lower portions 14, 18 toward and away from each other as they are rotated with respect to each other.

Figure 7:
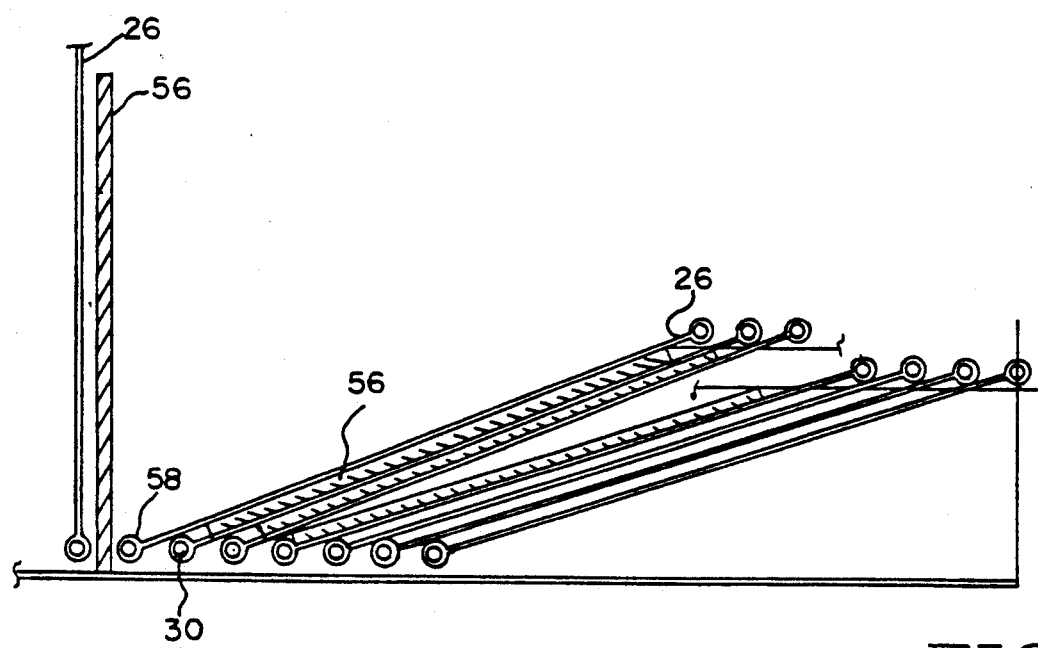
FIG. 7 is a schematical view illustrating the slides in various positions in the carousel according to the present invention.

FIG. 7 schematically illustrates a slide 56 positioned in the erect position and a plurality of slides 56 positioned in the collapsed position. Referring thereto, as discussed in detail above, the dividers 26 are pivotally disposed on the pivot rods 30. Therefore, each of the dividers 26 includes a circular hinge portion 58 which circumscribes each of the pivot rods 30. In the erect position, the bottom of each of the slides 56 is positioned between each of the circular hinge portions 58 of the dividers such they can easily be withdrawn from the carousel during operation. In order to reposition the slides into the collapsed position, it is necessary to hold the carousel upside down such that the slides 56 move toward the top plate and away from the hinge portions 58 allowing the dividers 26 to pivot to a substantially diagonal position overlapping one another without the slides interfering with the adjacent dividers as can be seen by the location of the collapsed slides 56 in FIG. 7.

Unlike a conventional slide carousel, the carousel of the present invention requires that the slides be loaded from the bottom side thereof. Specifically, the slides are individually introduced through the opening in the bottom plate 20 as the carousel is incrementally rotated with respect thereto. Using a removal ring (not shown) the slides can be loaded from the top. However, once the carousel has been loaded, the collapsible carousel can be easily stored in a compact manner by simply rotating the upper portion 14 with respect to the lower portion until the upper and lower portions are locked together, as explained above. When actuating the carousel 10 to its collapsed configuration, it is important to first turn the carousel upside down so that the slides will not be positioned beneath and between the pivot rods 30. If the slides are positioned between the pivot rods 30 when the carousel is collapsed, they might be bent by the dividers 26.

It will be appreciated that, although specific embodiments of the invention have been described herein for the purpose of illustration, various modifications may be made without departing from the spirit and scope of the invention. Accordingly, the invention is not to be limited except as by the appended claims.

We claim:

1. A collapsible slide tray, comprising:
   an upper portion;
   a lower portion;
   collapsing means for allowing said upper portion to move toward said lower portion to reconfigure said slide tray from an erect configuration to a collapsed configuration; and
   slide holding means for holding a plurality of slides between said upper and lower portions while allowing said slides to pivot when said tray is reconfigured between its erect and collapsed configurations.

2. The collapsible slide tray of claim 1 wherein said slide holding means comprise:
   a plurality of dividers positioned substantially between said upper portion and said lower portion, said dividers being pivotally mounted so that they can pivot between an erect position in which said slides are disposed substantially vertically, and a collapsed position in which said slides are disposed in an angular position overlapping one another.

3. The collapsible slide tray of claim 2 wherein said slide tray is a circular slide carousel.

4. The slide tray of claim 3 wherein said upper portion is rotatably disposed with respect to said lower portion, said carousel being adjustable between said erect position and said collapsed position by rotating said upper portion with respect to said lower portion.

5. The slide tray of claim 4 wherein in said erect position said upper portion is displaced from said lower portion and in said collapsed position said upper portion is disposed adjacent said lower portion.

6. The slide tray of claim 5, further comprising spring means for urging said upper portion away from said lower portion such that said slides are urged toward said erect position.

7. The slide tray of claim 3, further comprising:
   first pivot means for pivotally connecting a top end of each of said dividers to said upper portion; and
   second pivot means for connecting a bottom end of each of said dividers to said lower portion wherein said slides are respectively disposed between each of said dividers.

8. The slide tray of claim 7 wherein said upper portion comprises a disc-like plate having a pair of radially disposed slots extending circumferentially around said plate and wherein said first pivot means comprises a slide rod slidably disposed in each of said dividers, the opposite ends of said slide rods extending outwardly from said separators and respectively into said slots, said slide rods being retained within said slots.

9. The slide tray of claim 8 wherein the outer end of each of said slide rods is pivotally secured to said upper portion about a vertical pivot axis.

10. The slide tray of claim 7 wherein said lower portion comprises:
    a central hub; and
    an outer ring circumscribing said hub, said inner and outer rings being interconnected by said second pivot means.

11. The slide tray of claim 10 wherein said second pivot means comprises a plurality of pivot rods, one end of each of said pivot rods being secured to said hub and the other end of each of said pivot rods being secured to said outer ring, each of said separators being pivotally disposed on each of said pivot rods.

12. The slide tray of claim 4, further comprising means for locking said carousel in said collapsed position.

13. The slide tray of claim 12 wherein said locking means comprises a protrusion extending from said hub of said upper portion, said protrusion being engageable with at least one pawl pivotally mounted on said lower portion.

14. A collapsible slide tray, comprising:
    a base portion adapted to be received by a slide projector; and
    support means for supporting a plurality of slides on said base so that said slides can be moved between an erect configuration in which said slides project upwardly from said base and a collapsed configuration in which said slides recline along said base while said slides remain in said support means.

15. The collapsible slide tray of claim 14 wherein said support means comprise a plurality of slide separators mounted on said base in a manner that allows said slide separators to be moved between said erect configuration in which said slide separators project upwardly from said base and said collapsed configuration in which said slide separators recline along said base, said slide separators being positioned adjacent each other but separated apart from each other a sufficient distance to allow a photographic slide to be positioned therebetween.

16. The collapsible slide tray of claim 15 wherein said slide separators are pivotally mounted on said base.

17. The collapsible slide tray of claim 15, further including a top portion to which said slide separators are attached, said slide separators be attached to said top portion in a manner that allows said slide separators to extend perpendicularly between said base and top portion in said erect configuration and said slide separators to overlap each other as they extend between said base and top portion at an angle in said collapsed configuration.

18. The collapsible slide tray of claim 17 wherein said slide separators are pivotally secured to said base and said top portion.

19. The collapsible slide tray of claim 17 wherein said base and top portion each have an annular configuration so that said slide tray is adapted to be received by a slide projector for circular slide carousels, and wherein said base and said top portion rotate with respect to each other when said slide tray is being moved between its collapsed and erect positions.

20. The collapsible slide tray of claim 18 wherein each of said slide separators is attached to said top portion by respective shafts that extend along a radial of said slide tray when said slide tray is in its erect configuration, and wherein each of said slide separators is slidably secured to its respective shaft and said shafts are secured to said top portion in a manner that allows said shafts to pivot out of alignment with a radial of said slide tray when said slide tray is moved between its erect and its collapsed configuration.

21. The collapsible slide tray of claim 15 wherein said base has an annular configuration adapted to be received by a slide projector for circular slide carousels, and wherein the area between said slide separators assumes a generally triangular configuration in plan view when said slide tray is in its erect configuration.

22. The collapsible slide tray of claim 15 wherein said slide separators are mounted so that the distance between said slide separators is reduced as said slide tray moves from its erect configuration to its collapsed configuration.

23. A method of storing and displaying photographic slides, comprising:
 placing said slides in a tray having support means for said slides for placing said slides in an upright position so that said slide tray is in condition for use in a slide projector;
 placing said slide tray in a slide projector and allowing said slide projector to withdraw individual slides from said slide tray while said slides are in their upright position; and
 removing said slide tray from said projector and then positioning said slides in a reclined position while said slides remain in said support means in said tray so that said slides overlap each other thereby making said slide tray relatively compact for transport and storage.

24. The method of claim 23 wherein said slide tray includes a plurality of slide separators which are pivotally mounted in said slide tray, and wherein each of said slides is positioned between two slide separators.

25. The method of claim 23 wherein said slide tray further includes a base and a top portion, and said slide separators are pivotally attached at opposite edges to said base and said top portion, and wherein said slides are positioned in a reclined position by rotating said base relative to said top portion, thereby causing said slide separators and the slides therebetween to recline into overlapping positions.

26. The method of claim 24 wherein said base is an arcuate plate positioned beneath said slide separators, and wherein said slides are removed from said slide tray through a slot formed in said base.

27. The method of claim 25 wherein said slides are placed in said tray through an opening in the top portion of said slide tray.

* * * * *